US010016961B2

(12) United States Patent
Bekele (10) Patent No.: US 10,016,961 B2
(45) Date of Patent: Jul. 10, 2018

(54) POLYMERIC FILM COMPRISING QUIET LAYER WITH IMPROVED NOISE DAMPENING PROPERTIES

(71) Applicant: Cryovac, Inc., Duncan, SC (US)

(72) Inventor: Solomon Bekele, Taylors, SC (US)

( * ) Notice: Subject to any disclaimer, the term of this patent is extended or adjusted under 35 U.S.C. 154(b) by 685 days.

(21) Appl. No.: 14/192,907

(22) Filed: Feb. 28, 2014

(65) Prior Publication Data
US 2015/0246509 A1    Sep. 3, 2015

(51) Int. Cl.
| B32B 27/08 | (2006.01) |
| B32B 27/30 | (2006.01) |
| B32B 27/36 | (2006.01) |

(52) U.S. Cl.
CPC .......... *B32B 27/08* (2013.01); *B32B 27/302* (2013.01); *B32B 27/304* (2013.01); *B32B 27/36* (2013.01); *B32B 2307/102* (2013.01); *B32B 2307/54* (2013.01); *B32B 2307/7265* (2013.01); *B32B 2307/758* (2013.01); *B32B 2439/46* (2013.01); *B32B 2439/80* (2013.01); *Y10T 428/1341* (2015.01); *Y10T 428/31928* (2015.04); *Y10T 428/31935* (2015.04); *Y10T 428/31938* (2015.04)

(58) Field of Classification Search
CPC ....... B32B 27/08; B32B 27/36; B32B 27/304; B32B 27/302; B32B 2439/46; B32B 2307/758; B32B 2439/80; B32B 2307/102; B32B 2307/7265; B32B 2307/54; Y10T 428/1341; Y10T 428/31935; Y10T 428/31928; Y10T 428/31938
See application file for complete search history.

(56) References Cited

U.S. PATENT DOCUMENTS

| 5,290,842 A | 3/1994 | Sasaki et al. |
| 5,663,228 A | 9/1997 | Sasaki et al. |
| 5,681,627 A | 10/1997 | Mueller |
| 6,455,161 B1 | 9/2002 | Regnier et al. |
| 7,351,645 B2 | 4/2008 | Ohashi et al. |
| 8,399,077 B1 | 3/2013 | Bekele |
| 2002/0025394 A1 | 2/2002 | Bradfute et al. |
| 2007/0142557 A1 | 6/2007 | Karsten et al. |
| 2007/0237916 A1 | 10/2007 | Rasmussen et al. |

(Continued)

FOREIGN PATENT DOCUMENTS

| EP | 1149598 A2 | 10/2001 |
| WO | 2012088213 A1 | 6/2012 |
| WO | 2013096078 A1 | 6/2013 |

OTHER PUBLICATIONS

Hwang et al., "Thermal and Mechanical Properties of Amorphous Copolyester (PETG)/LCP Blends", European Polymer Journal vol. 35, pp. 1439-1443 (1999).

*Primary Examiner* — James C Yager (57) ABSTRACT

The presently disclosed subject matter is directed to polymeric films suitable for use in a wide variety of applications, such as the formation of ostomy bags, incontinence bags, medical collection bags, and the like. Specifically, the disclosed films comprise at least one barrier layer. At least one quiet layer positioned adjacent to the barrier layer incorporates sound dampening polymers. As a result, the disclosed films maintain improved sound dampening, as well as exemplary barrier characteristics and high tensile strength compared to prior art barrier films.

18 Claims, 1 Drawing Sheet

(56) References Cited

U.S. PATENT DOCUMENTS

| | | |
|---|---|---|
| 2010/0121290 A1 | 5/2010 | Rasmussen et al. |
| 2011/0081530 A1* | 4/2011 | Robinson .............. B29C 55/023 428/212 |
| 2011/0118679 A1 | 5/2011 | Bekele et al. |
| 2011/0125114 A1 | 5/2011 | Bekele |

* cited by examiner

POLYMERIC FILM COMPRISING QUIET LAYER WITH IMPROVED NOISE DAMPENING PROPERTIES

CROSS REFERENCE TO RELATED APPLICATIONS

This application claims priority to U.S. Provisional Patent Application No. 61/803,607, filed Mar. 20, 2013, the entire content of which is hereby incorporated by reference herein.

FIELD OF THE INVENTION

The presently disclosed subject matter relates generally to polymeric films suitable for the production of pouches. Particularly, the presently disclosed films exhibit improved noise dampening characteristics while also providing favorable tensile strength and barrier properties.

BACKGROUND

Multilayer films having gas and odor barrier properties are well known and widely used in the medical and food packaging industries. Generally, it is desirable for such films to have good impact resistance, flexibility, barrier properties, and desirable optical properties.

Where the films are to be used in medical applications (such as for the construction of ostomy pouches), they must possess a unique combination of odor and moisture barrier properties. Such films have been provided in the prior art through the use of multi-ply film laminates with at least one ply that is oxygen and moisture vapor impermeable. Particularly, films currently used in ostomy applications utilize polyvinylidene chloride (PVDC) or copolymers of vinylidene chloride as the barrier layer of a multilayer film.

In addition to barrier properties, it is often desirable that polymeric films for use in medical applications produce minimal noise when flexed or wrinkled to avoid embarrassment to users. For example, it has been observed that ostomy pouches constructed from conventional films comprising PVDC emit noise during movement, believed to be a result of the crystallinity of the PVDC layer. As a result, users can experience increased embarrassment as attention is drawn to the ostomy appliance.

Accordingly, it would be beneficial to provide noise dampening polymeric films that exhibit high tensile strength and suitable barrier properties.

SUMMARY

DETAILED DESCRIPTION

I. General Considerations

The presently disclosed subject matter is directed to polymeric films suitable for use in a wide variety of applications, such as the formation of ostomy bags, incontinence bags, medical collection bags, and the like. Specifically, the disclosed films comprise at least one barrier layer (optionally comprising PVDC) and at least one layer adjacent to the barrier layer that incorporates sound dampening polymers. As a result, the disclosed films exhibit improved sound dampening characteristics, as well as maintain exemplary barrier properties and high tensile strength compared to prior art barrier films.

II. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a film" includes a plurality of such films, and so forth.

Unless indicated otherwise, all numbers expressing quantities of components, reaction conditions, and so forth used in the specification and claims are to be understood as being modified in all instances by the term "about" Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, and in some embodiments ±0.1%, from the specified amount, as such variations are appropriated in the disclosed film and methods.

As used herein, the term "adjacent" as applied to film layers refers to the positioning of two layers of the film in contact with one another with or without an intervening layer (such as a tie layer), adhesive, or other layer therebetween.

As used herein, the terms "barrier" and "barrier layer" as applied to films and/or film layers, refer to the ability of a film or film layer to serve as a barrier to gases and/or odors. Examples of polymeric materials with low oxygen transmission rates useful in such a layer can include: ethylene/vinyl alcohol copolymer (EVOH), polyvinylidene dichloride (PVDC), vinylidene chloride copolymer such as vinylidene chloride/methyl acrylate copolymer, vinylidene chloride/vinyl chloride copolymer, polyamide, co-polyamide, PGA, polyester, polyacrylonitrile (available as Barex™ resin), or blends thereof. Oxygen barrier materials can further comprise high aspect ratio fillers that create a tortuous path for permeation (e.g., nanocomposites). Oxygen barrier properties can be further enhanced by the incorporation of an oxygen scavenger, such as an organic oxygen scavenger. In some embodiments, metal foil, metallized substrates (e.g., metallized polyethylene terephthalate ((PET)), metallized polyamide, and/or metallized polypropylene), and/or coatings comprising SiOx or AlOx compounds can be used to provide low oxygen transmission to a package. In some embodiments, a barrier layer can have a gas (e.g., oxygen) permeability of less than or equal to about 500 cc/m$^2$/24 hrs/atm at 73° F., in some embodiments less than about 100 cc/m$^2$/24 hrs/atm at 73° F., in some embodiments less than about 50 cc/m²/24 hrs/atm at 73° F., and in some embodiments less than about 25 cc/m²/24 hrs/atm at 73° F.

The term "bulk layer" as used herein refers to a layer used to increase the abuse-resistance, toughness, modulus, etc., of a film. In some embodiments, the bulk layer can comprise polyolefin (including but not limited to) at least one member selected from the group comprising ethylene/alpha-olefin copolymer, ethylene/alpha-olefin copolymer plastomer, low density polyethylene, and/or linear low density polyethylene and polyethylene vinyl acetate copolymers.

As used herein, the term "core", and the phrase "core layer", as applied to multilayer films, can refer to any inner (i.e., internal) film layer that has a primary function other than serving as an adhesive or compatibilizer for adhering two layers to one another. In some embodiments, the core layer or layers provide a film with a desired level of strength, i.e., modulus, and/or optics, and/or added abuse resistance, and/or specific impermeability.

The term "directly adjacent" as used herein refers to adjacent layers that are in contact with another layer without any tie layer, adhesive, or other layer therebetween.

"Ethylene alpha-olefin copolymer" as used herein refers to copolymers of ethylene with one or more comonomers selected from $C_3$ to $C_{10}$ alpha-olefins (such as propene, butene-1, hexene-1, octene-1, and the like) in which the molecules of the copolymers comprise long polymer chains with relatively few side chain branches arising from the alpha-olefin that was reacted with ethylene. Ethylene alpha-olefin copolymer includes such heterogeneous materials as linear medium density polyethylene (LMDPE), linear low density polyethylene (LLDPE), and very low and ultra low density polyethylene (VLDPE and ULDPE), as well as linear homogeneous ethylene/alpha olefin copolymers (HEAO), and long chain branched olefin copolymers (HEAO), as would be appreciated by those of ordinary skill in the art.

As used herein, the term "film" can be used in a generic sense to include plastic web, regardless of whether it is film or sheet. In some embodiments, the term "film" can include a nonwoven fabric, paper tissue, and like materials.

The term "fluid" as used herein refers to liquids, gases, semi-solids, pastes, gels, and combinations thereof. In some embodiments, the term "fluid" can include any substance that is not a solid.

The term "hydrogenated styrenic elastomer" as used herein refers to the hydrogenated product of a styrenic elastomer. The term "styrenic elastomer" refers to an elastomer having at least one random or block segment of a styrenic monomer. For example, in some embodiments, hydrogenated styrenic elastomers can include polymers containing a random copolymer block of hydrogenated conjugated diene and/or alkylene and an aromatic vinyl compound. Examples of suitable aromatic vinyl compounds can include (but are not limited to) styrene, alpha-methylstyrene, p-methylstyrene, divinylbenzene, 1,1-diphenylethylene, N,N-dimethyl-p-aminoethylstyrene, N,N-diethyl-p-aminoethylstyrene, and combinations thereof. The conjugated diene mentioned above can be a diolefin having a pair of conjugated double bonds, and examples thereof can include (but are not limited to) 1,3-butadiene, isoprene, 2-methyl-1,3-butadiene (isoprene), 2,3-dimethyl-1,3-butadiene, 1,3-pentadiene, 2-methyl-1,3-pentadiene, 1,3-hexadiene, and combinations thereof. The alkylene mentioned above can refer to a monoolefinic unit, such as ethylene unit, propylene unit, butylene unit, hexylene unit, octylene unit, or combinations thereof.

The term "multilayer film" as used herein refers to a thermoplastic material, generally in sheet or web form, having one or more layers formed from polymeric or other materials that are bonded together by any conventional or suitable method, including one or more of the following: coextrusion, extrusion coating, lamination, vapor deposition coating, solvent coating, emulsion coating, and/or suspension coating.

As used herein, "oxygen transmission rate" (OTR) is measured according to ASTM D-3985, a test known to those of ordinary skill in the film art. The content of all ASTM standards referred to herein are hereby incorporated in reference in their entireties.

As used herein, the term "polymer" refers to the product of a polymerization reaction, and can be inclusive of homopolymers, copolymers, terpolymers, etc. In some embodiments, the layers of a film can consist essentially of a single polymer, or can have additional polymer together therewith, i.e., blended therewith.

The term "pouch" as used herein is not limiting and includes the wide variety of containers known in the art, including (but not limited to) bags, packets, packages, and the like. In some embodiments, the term "pouch" includes any protective or collective device having an opening adapted to be secured about a stoma for protecting the user and for collecting exudate. Such pouches are well known in the art; e.g., U.S. Pat. Nos. 3,827,435; 3,954,105; 4,205,678; 4,268,286; 4,983,171; and 5,074,851, the entire disclosures of which are hereby incorporated by reference herein.

As used herein, the term "seal" refers to any seal of a first region of an outer film surface to a second region of an outer film surface, including heat or any type of adhesive material, thermal or otherwise. In some embodiments, the seal can be formed by heating the regions to at least their respective seal initiation temperatures. The sealing can be performed by any one or more of a wide variety of means, including (but not limited to) using a heat seal technique (e.g., melt-bead sealing, thermal sealing, impulse sealing, dielectric sealing, radio frequency sealing, ultrasonic sealing, hot air, hot wire, infrared radiation).

As used herein, the phrases "seal layer", "sealing layer", "heat seal layer", and "sealant layer", refer to an outer film layer, or layers, involved in the sealing of the film to itself, another film layer of the same or another film, and/or another article that is not a film. It should also be recognized that in general, up to the outer 3 mils of a film can be involved in the sealing of the film to itself or another layer. In general, a sealant layer sealed by heat-sealing layer comprises any thermoplastic polymer. In some embodiments, the heat-sealing layer can comprise, for example, thermoplastic polyolefin, thermoplastic polyamide, thermoplastic polyester, and thermoplastic polyvinyl chloride. In some embodiments, the heat-sealing layer can comprise thermoplastic polyolefin.

The term "styrene block copolymer" as used herein refers to a polymer having at least one block segment of a styrenic monomer in combination with at least one saturated or unsaturated rubber monomer segment. In some embodiments, suitable styrene block copolymers can include (but are not limited to) styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like.

The term "tan delta" or "tangent delta" as used herein refers to the ability of a material to dampen noise and/or vibration, as measured by ASTM D-4065.

As used herein, the term "tie layer" refers to an internal film layer having the primary purpose of adhering two layers to one another. In some embodiments, tie layers can comprise any nonpolar polymer having a polar group grafted thereon, such that the polymer is capable of covalent bonding to polar polymers such as polyimide, PGA, and/or ethylene/vinyl alcohol copolymer. In some embodiments, tie layers can comprise at least one member selected from the group including, but not limited to, modified polyolefin, modified ethylene/vinyl acetate copolymer, and/or homogeneous ethylene/alpha-olefin copolymer. In some embodiments, tie layers can comprise at least one member selected from the group consisting of anhydride modified grafted linear low density polyethylene, anhydride grafted low density polyethylene, homogeneous ethylene/alpha-olefin copolymer, and/or anhydride grafted ethylene/vinyl acetate copolymer.

The term "vinylidene chloride polymer" or "vinylidene chloride copolymer" or "PVDC" as used herein refers to a vinylidene chloride-containing polymer or copolymer. Particularly, PVDC can refer to a polymer that includes monomer units derived from vinylidene chloride ($CH_2=CCl_2$) and also, optionally, monomer units derived from one or more of vinyl chloride, styrene, vinyl acetate, acrylonitrile, and C1-C12 alkyl esters of (meth)acrylic acid (e.g., methyl acrylate, butyl acrylate, methyl methacrylate). Examples of PVDC include one or more of the following: vinylidene chloride homopolymer, vinylidene chloride/vinyl chloride copolymer ("VDC/VC"), vinylidene chloride/methyl acrylate copolymer, vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer. In some embodiments, the PVDC can include between about 75 and 98 weight % vinylidene chloride monomer. Therefore, in some embodiments, the PVDC can include about 5 to about 25 weight %, from about 10 to about 22 weight %, and from about 15 about 20 weight % comonomer with the vinylidene chloride monomer. In some embodiments, the PVDC can have a weight-average molecular weight (Mw) of at least 50,000, such as at least 90,000, at least 100,000, at least 111,000, at least 120,000, at least 150,000, and at least 180,000; and between 80,000 and 180,000, such as between 90,000 and 170,000, between 100,000 and 160,000, between 111,000 and 150,000, and between 120,000 and 140,000. In some embodiments, the PVDC can have a viscosity-average molecular weight (Mz) of at least 130,000, such as at least 150,000, at least 170,000, at least 200,000, at least 250,000, and at least 300,000; and between 130,000 and 300,000, such as between 150,000 and 270,000, between 170,000 and 250,000, and between 190,000 and 240,000.

All compositional percentages used herein are presented on a "by weight" basis, unless designated otherwise.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

III. The Presently Disclosed Film

III.A. Generally

The presently disclosed subject matter is directed to a polymeric film suitable for use in a wide variety of applications, such as the formation of ostomy bags, incontinence bags, medical collection bags, and the like. Particularly, in some embodiments, the disclosed film includes a barrier layer comprising about 100 weight percent PVDC and at least one adjacent quiet layer comprising sound dampening polymers.

The disclosed film can comprise from 2 to 20 layers; in some embodiments, from 2 to 12 layers; in some embodiments, from 2 to 9 layers; and in some embodiments, from 3 to 8 layers. Thus, in some embodiments, the disclosed film can have 2, 3, 4, 5, 6, 7, 8, 9, 10, 11, 12, 13, 14, 15, 16, 17, 18, 19, or 20 layers. One of ordinary skill in the art would also recognize that the disclosed film can comprise more than 20 layers, such as in embodiments wherein the film components comprise microlayering technology.

The disclosed film can have any total thickness desired, so long as the film provides the desired properties for the particular packaging operation in which the film is used, e.g., optics, modulus, seal strength, and the like. Final web thicknesses can vary, depending on processing, end use application, and the like. Typical thicknesses can range from about 0.1 to 20 mils; in some embodiments, about 0.3 to 15 mils; in some embodiments, about 0.5 to 10 mils; in some embodiments, about 1 to 8 mils; in some embodiments, about 1 to 4 mils; and in some embodiments, about 1 to 2 mils. Thus, in some embodiments, the film can have a thickness of about 10 mils or less; in some embodiments, a thickness of about 5 mils or less.

The disclosed film can be cross-linked, depending upon the application for which the film is utilized. Cross-linking increases the structural strength of the film at elevated temperatures and/or increases the force at which the material can be stretched before tearing apart. Cross-linking can be achieved through the use of irradiation (i.e., bombarding the film with particulate or non-particulate radiation such as high-energy electrons from an accelerator or cobalt-60 gamma rays) to cross-link the materials of the film. In some embodiments, the irradiation dosage level can be in the range of from about 2 megarads (M.R.) to about 12 M.R. Any conventional cross-linking technique can be used. For example, electronic cross-linking can be performed using curtain-beam irradiation. Chemical cross-linking techniques can also be employed (e.g., by the use of peroxides).

In some embodiments, the disclosed film can be transparent (at least in the non-printed regions) such that the packaged product is visible through the film. The term "transparent" as used herein can refer to the ability of a material to transmit incident light with negligible scattering and little absorption, enabling objects (e.g., packaged food or print) to be seen clearly through the material under typical unaided viewing conditions (i.e., the expected use conditions of the material). The transparency of the film can be at least about any of the following values: 20%, 25%, 30%, 40%, 50%, 65%, 70%, 75%, 80%, 85%, and 95%, as measured in accordance with ASTM D1746. Alternatively, in some embodiments, the disclosed film can include one or more pigments (such as tan, grey, and/or white coloring), as can be appreciated by those of ordinary skill in the art. Further, in some embodiments, at least one surface of the disclosed film can be embossed or texturized to improve resistance to blocking, machinability, and/or handleability or to impart some performance benefit, such as softness or suppleness to the film.

In some embodiments, the disclosed film can comprise printed product information such as (but not limited to) product size, type, name of manufacturer, instructions for use, and the like. Such printing methods are well known to those of ordinary skill in the packaging art.

III.B. Barrier Layer

As set forth herein, the disclosed film comprises at least one barrier layer. In some embodiments, the barrier layer comprises about 100 weight percent PVDC. Suitable PVDC polymers are available from Dow Chemical under the tradename SARAN® (e.g., SARAN® MA127 and SARAN® XO64501-00), Solvay (e.g., IXAN® PV891), Asahi (BARRIALON®), and Kureha (Krehalon®). However, the presently disclosed subject matter can include any of a wide variety of PVDC polymers and is not limited to those set forth above.

In some embodiments, the major amount of the PVDC copolymer comprises vinylidene chloride and a minor amount of the copolymer comprises one or more unsaturated monomers copolymerizable therewith, typically vinyl chlorides, styrenes, vinyl acetates, acrylonitriles, alkyl acrylates and/or methacrylates (e.g. methyl acrylate or methacrylate) or to a blend thereof in different proportions. Thus, in some embodiments, PVDC copolymer comprises about 51-99, 60-99, 70-95, or 75-95 weight percent vinylidene chloride (i.e., at least 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent). To this end, in some embodiments, the PVDC copolymer comprises about 1-49, 1-40, 5-30, or 5-25 weight percent unsaturated monomer or monomers (i.e., no more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or 49 weight percent).

In some embodiments, the disclosed barrier layer comprises about 100 weight percent PVDC. Particularly, in some embodiments, the PVDC in the barrier layer can be blended with very small amounts of processing aids (such as, but not limited to, butyl acrylate/methyl methacrylate/butyl methacrylate terpolymers), stabilizers (such as, but not limited to, magnesium aluminum hydroxy carbonate hydrate), odor absorbers (such as, but not limited to, aluminum aluminosilicate), and the like as would be well known to those of ordinary skill in the art.

III.C. Quiet Layer

As set forth herein above, at least one quiet layer is positioned adjacent to the barrier layer in the presently disclosed film. In some embodiments, at least one quiet layer is positioned directly adjacent to the barrier layer in the disclosed film. Without being bound by any particular theory, it is believed that the sound dampening polymers incorporated within the sound dampening layers assist in the prevention of noise attributable to the barrier layer. Particularly, it is believed that the noise dampening layers convert the noise into viscous energy and thus prevent further propagation of the noise.

In some embodiments, the disclosed quiet layer(s) comprise about 3 to 97 weight percent sound dampening polymers blended with about 3 to 97 weight percent ethylene ester copolymers. Thus, in some embodiments, the quiet layer comprises about 20 to 94, about 30 to 93, about 40 to 92, about 50 to 91, about 60 to 90, or about 60 to 80 weight percent ethylene ester copolymers, based on the total weight of the layer. In some embodiments, the disclosed quiet layer can include about 3 to 70, about 5 to 60, about 10 to 50, or about 10 to 40 weight percent sound dampening polymers, based on the total weight of the layer.

The disclosed sound dampening polymers can include (but are not limited to) styrene block copolymers and/or styrenic elastomers. Suitable styrene block copolymers can include (but are not limited to) styrene butadiene styrene (SBS), styrene isoprene styrene (SIS), styrene ethylene/butylene styrene (SEBS), styrene ethylene/propylene styrene (SEPS), styrene ethylene/ethylene-propylene-styrene (SEEPS), and the like. In some embodiments, the quiet layer is free from ethylene/alpha-olefin copolymers (i.e., contains no ethylene/alpha-olefin copolymer).

Suitable ethylene ester copolymers can include (but are not limited to) any of the wide variety of heterogeneous materials with a density usually in the range of from about 0.915 g/cm$^3$ to about 0.930 g/cm$^3$ (LLDPE), from about 0.930 g/cm$^3$ to about 0.945 g/cm$^3$ (MDPE), or lower than about 0.915 g/cm$^3$ (VLDPE and ULDPE). Suitable ethylene alpha-olefins can further include homogeneous polymers, such as metallocene-catalyzed EXACT® and EXCEED® homogeneous resins obtainable from Exxon, single-site AFFINITY® resins obtainable from Dow, and TAFMER® homogeneous ethylene-alpha-olefin copolymer resins obtainable from Mitsui. All the disclosed materials can include copolymers of ethylene with one or more co-monomers selected from (C4-C10)-alpha-olefin, such as butene-1, hexene-1, octene-1, and the like, in which the molecules of the copolymers include long chains with relatively few side chain branches or cross-linked structures. Suitable ethylene ester copolymers can further comprise ethylene vinyl acetate copolymers, ethylene methyl acrylate copolymer and the like, as would be appreciated by those of ordinary skill in the packaging art. In some embodiments, the ethylene ester copolymer can comprise blends of the above-mentioned materials.

The disclosed quiet films exhibit a tangent (tan) delta of at least about 0.1 at a temperature of −25° C. to 40° C., measured in accordance with ASTM D-4065. Thus, in some embodiments, the disclosed films have a tan delta of about 0.1 to about 0.4 at a temperature of −25° C. to 40° C., in accordance with ASTM D-4065. Tan delta can also be measured in accordance with ISO 6721-1, as would be appreciated by those of ordinary skill in the art.

It has been found that films comprising at least one quiet layer have improved quietness in a wide variety of applications, such as (but not limited to) medical purposes. For example, during normal use of ostomy pouches, the temperature to which the pouch is exposed is typically greater than that of the ambient room temperature. The increase can be a result of the temperature of the fluids within the pouch and/or proximity of the pouch to the wearer. The presently disclosed films provide improved reductions in emitted noise levels at ambient and slightly elevated temperature ranges and thus are particularly suitable in medical applications, such as for use with ostomy pouches.

III.D. Exterior Layers

In some embodiments, the disclosed film comprises first and second exterior film layers that comprise a blend of two or more ethylene ester copolymers. In some embodiments, the blend comprises about 20-90, 30-95, 40-90, 50-85, or 60-80 weight percent ethylene ester copolymers (such as EVA, for example), based on the total weight of the layer. In some embodiments, the blend comprises about 10-50, 15-45, 17-42, or 20-40 weight percent ethylene/alpha-olefin copolymer, based on the total weight of the layer.

III.E. Additional Layers

In some embodiments, the disclosed film can comprise an abuse layer. The abuse layer can be any film layer, so long as the film layer serves to resist abrasion, puncture, or other potential causes of reduction of package integrity or package appearance quality.

In some embodiments, the presently disclosed film can comprise one or more bulk layers that function to increase the abuse resistance, toughness, and/or modulus of the film.

In some embodiments, the disclosed film can comprise one or more tie layers adapted for improving the adherence of one layer of the film to another layer.

Various combinations of layers can be used in the formation of a multilayer film in accordance with the presently disclosed subject matter. For example, in some embodiments, the disclosed film can comprise the following combination A/B/Q/C/Q/B/D or A/Q/B/C/B/Q/A, where A represents a sealant layer; B represents a barrier layer (such as PVDC), C represents a core layer (which can be a bulk layer or an abuse layer); Q represents a quiet layer; and D represents a skin layer. One or more tie layers (T) can be used between any one or more layers of the above multilayer film structures (i.e., A/T/Q/B/T/C/T/B/Q/T/D or A/T/B/T/Q/T/C/T/Q/T/B/T/A). Further, one or more abuse (E) and/or bulk layers (F) can be used in between any one or more layers of the above multilayer film structures, as would be known to those of ordinary skill in the art.

Regardless of the film structure, the disclosed film and/or layers can include other additives commonly used in the art. For example, in some embodiments, such additives can include (but are not limited to) thermal stabilizers, lubricating aids, processing aids, slip agents, antiblock agents, and/or pigments. In some embodiments, the amount of additives present in the film is minimized such that the film properties are not deteriorated.

IV. Methods of Making the Disclosed Film

The disclosed film can be manufactured using any of a variety of processes known in the art, including extrusion (e.g., blow-film extrusion, coextrusion, extrusion coating, free film extrusion, and lamination), casting, and adhesive lamination. A combination of these processes can also be employed. Such processes are well known to those of ordinary skill in the packaging art. For example, extrusion coating is described in U.S. Pat. No. 4,278,738 to Brax, the entire content of which is incorporated herein by reference. Coextrusion manufacture can use, for example, a tubular trapped bubble film process or a flat film (i.e., cast film or slit die) process.

V. Methods of Using the Disclosed Film

When the disclosed film is used to form a pouch (such as an ostomy pouch), an external layer forms the outer surface of the pouch (i.e., the surface that is exposed to the environment) while a seal layer forms the inner surface of the pouch (i.e., the surface that is in contact with the inside of the pouch and, therefore, with the product, drainage, or air that is enclosed within the pouch). In this role, peripheral portions of the seal layer can be joined, e.g., by heat-sealing, impulse-sealing, or radio frequency (RF) sealing, to form an enclosure.

In the case of heat-sealing, the sealant layer is either folded upon itself or mated with the sealant layer of another piece of film such that two regions of the sealant layer are brought into contact with one another and sufficient heat is applied to predetermined (e.g., peripheral) segments of the contacting regions of the second exterior layer that the heated segments become molten and intermix with one another. Upon cooling, the heated segments of the second exterior layer become a single, essentially inseparable layer. In this manner, the heated segments of the second exterior layer produce a liquid-tight closure, commonly referred to as a heat seal. The heat seals thus formed are linked together to define the peripheral boundaries of the pouch so that the pouch contents can be fully enclosed therein. Accordingly, the disclosed film structure can advantageously be used to form a drainage pouch, such as an ostomy pouch. Such a structure combines excellent gas barrier functionality and strength with a high degree of quietness.

Figure 1:
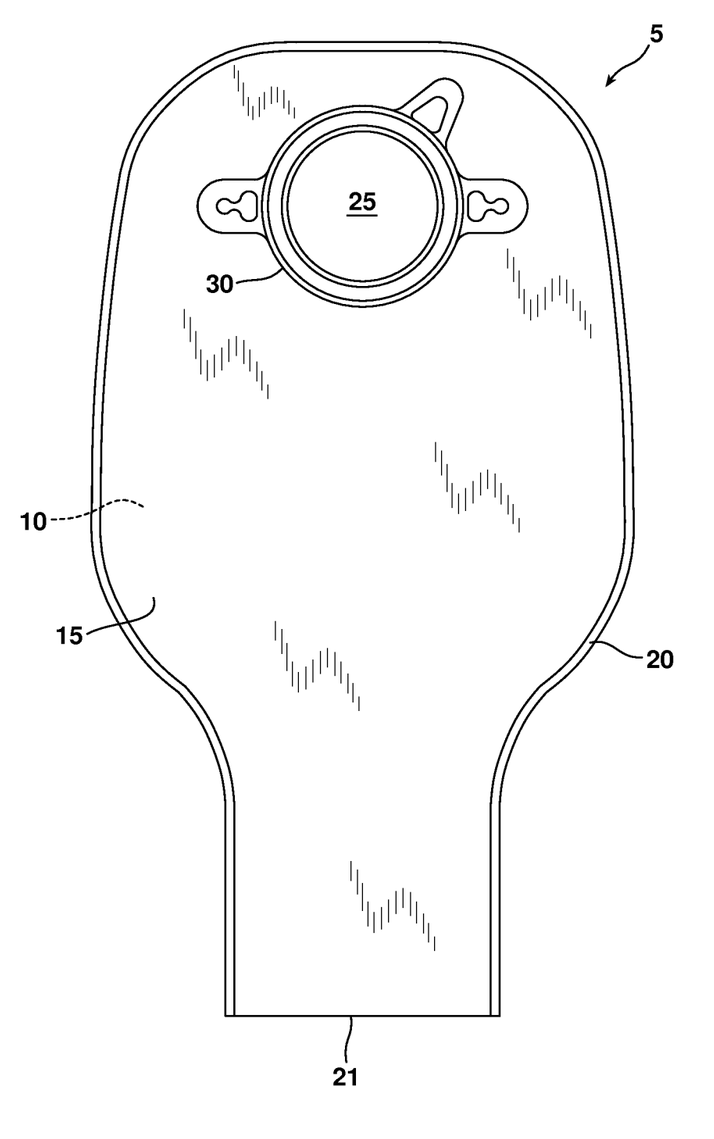
FIG. 1 is a top plan view of an ostomy pouch in accordance with some embodiments of the presently disclosed subject matter.

FIG. 1 illustrates one embodiment of an ostomy pouch that can be constructed from the presently disclosed film. Particularly, pouch 5 comprises front and rear walls 10, 15 joined along their edges by heat seal 20 or any other suitable means. The pouch has a drain opening 21 that can be closed by folding, clamping, and/or any of a wide variety of known closure techniques. In some embodiments, rear wall 15 includes a stoma-receiving opening 25 surrounded by attachment 30. In the embodiment depicted in FIG. 1, the pouch is one component of a two-piece appliance and its attachment can take the form of a coupling ring having a channel for releasably engaging the mating element of a faceplate coupling ring (not shown), all of which is known in the art. Alternatively, attachment 30 can take the form of an adhesive ring or patch designed to adhesively engage the peristomal skin surfaces of a wearer (i.e., a one-piece appliance) or the smooth surface of a faceplate that is adhesively secured to the wearer (an adhesive two-piece appliance). To this end, other layers can be added to the disclosed film such as a comfort ply of moisture absorbent or waterproof tissue paper to improve the feel on the skin of the wearer. The ostomy pouch depicted in FIG. 1 is one of a wide variety of pouches that can be formed from the disclosed film. As such, the ostomy pouch of FIG. 1 is in no way intended to be limiting.

In use, when the disclosed film is formed into pouch 5, as the user moves, the noise accompanying movement of the barrier layer is dampened by the adjacent quiet layer or layers. As a result, the user beneficially can move without fear of noise from pouch 5. In addition, the pouch exhibits increased tensile strength and barrier properties. For example, in some embodiments, the disclosed film exhibits tensile strength of about 150 to about 400 kg/m$^2$ (measured in accordance with ASTM 882-12). Further, in some embodiments, the disclosed film exhibits oxygen transmission rate of about 1 to 100 cc/m$^2$-day-atm (measured in accordance with ASTM D-3985). Typically, pouch 5 (and/or the film used to construct, the pouch) has a noise level <50 decibels (dB) at one or more octave frequency bands between 1 kilohertz (kHz) and 16 kHz.

The disclosed films have been described in connection with medical applications. However, it is to be understood that other applications for the films are also possible, and that this disclosure should not be construed as being limited only to medical pouches or devices.

VI. Advantages of the Disclosed Film

The presently disclosed film offers a superior combination of properties, i.e., improved quietness, high tensile strength, effective gas, odor, and liquid barrier qualities. Specifically, the disclosed film includes at least one layer comprising one or more sound dampening polymers that provide the film with enhanced sound dampening capabilities, while also maintaining the effective gas barrier properties and high tensile strength.

The disclosed films also have high pliability characteristics, which render the films suitable for a wide variety of applications. For example, in some embodiments, the films can be particularly suitable for the manufacture of containers and bags intended for human drainage in medical applications (i.e., ostomy/urostomy use).

The disclosed films further beneficially provide odor barrier properties, such that they are suitable for use in food and medical packaging applications.

Although several advantages of the disclosed film are set forth in detail herein, the list is by no means limiting. Particularly, one of ordinary skill in the art would recognize that there can be several advantages to the disclosed film and methods that are not included herein.

EXAMPLES

The following Examples provide illustrative embodiments. In light of the present disclosure and the general level of skill in the art, those of ordinary skill in the art will appreciate that the following Examples are intended to be exemplary only and that numerous changes, modifications, and alterations can be employed without departing from the scope of the presently disclosed subject matter.

Several film structures in accordance with the presently disclosed subject matter and comparatives are identified herein below in Tables 1 and 2.

TABLE 1

Resin Identification

| Material Code | Trade Name or Designation | Source |
|---|---|---|
| A | TN2006 | Braskem S. A. (São Paulo, Brazil) |
| B | LF1020AA | Westlake Chemical Corporation (Houston, Texas, United States of America) |
| C | SYLOBLOC ® 47 | Grace Davison (Deerfield, Illinois, United States of America) |
| D | AFFINITY ® EG 8100 | Dow Chemical Company (Midland, Michigan, United States of America) |
| E | EVATANE ® 28-03 | Arkema (Colombes, France) |
| F | PV925 | Solvay Plastics (Brussels, Belgium) |
| G | Kemamide ® E Pellet | PMC Biogenix, Inc. (Mt. Laurel, New Jersey, United States of America) |
| H | ELVAX ® 3165 | E.I. DuPont de Nemours and Company (Wilmington, Delaware, United States of America) |
| I | PLASTISTRENGTH ® L1000 | Arkema (Colombes, France) |
| J | DHT-4A | Kisuma Chemicals BV (Veendam, Netherlands) |
| K | Zeoflair ® 200 | Zeochem, LLC (Louisville, Kentucky, United States of America) |
| L | Hybrar ® H5127 | Kuraray Europe GMBH (Nuremberg, Germany) |

TABLE 1-continued

Resin Identification

| Material Code | Trade Name or Designation | Source |
|---|---|---|
| M | Hybrar ® 7125 | Kuraray Europe GMBH (Nuremberg, Germany) |
| N | ESCORENE ® ULTRA FL00112 | ExxonMobile (Fairfax, Virginia, United States of America) |
| O | HM 728 | Braskem S.A. (Sao Paulo, Brazil) |
| P | ESCORENE ® FL 00226 | ExxonMobile (Fairfax, Virginia, United States of America) |
| Q | Septon ® YT-001 | Kuraray Europe GMBH (Nuremberg, Germany |
| R | S.O.E. ® L609 | Asahi Kasei Plastics (Chiyoda-ku, Tokyo, Japan) |
| S | S.O.E. ® S1611 | Asahi Kasei Plastics (Chiyoda-ku, Tokyo, Japan) |
| T | Infuse ® D9107 | Dow Chemical Company (Midland, Michigan, United States of America) |
| U | LL 1810 | Total Petrochemicals (Houston, Texas, United States of America) |
| V | Hybrar ® 5127F | Kuraray Europe GMBH (Nuremberg, Germany) |
| W | LOTRYL ® 24MA005 | Arkema (Colombes, France) |
| AA | PV73025558-ZA | Clariant Corporation (Charlotte, North Carolina, United States of America) |
| BB | FIBAPLAST gL-AB-EVA-k-FOLIE 20158413 | Karl Finke GmbH & Co. KG (Wuppertal, Germany) |
| CC | PV73025557-ZT | Clariant Corporation (Charlotte, North Carolina, United States of America) |
| DD | SP1802 | Westlake Chemical Corporation (Houston, Texas, United States of America) |
| EE | FIBAPLAST BEIGE EVA 440493 | Karl Finke GmbH & Co. KG (Wuppertal, Germany) |

A is ethylene/vinyl acetate copolymer (10-20 weight % comonomer).
B is linear low density ethylene/butene copolymer.
C is amorphous silica antiblock.
D is very low density ethylene/octene copolymer with flow rate of 1.0 (+/− 0.25) g/10 minutes (E-028) and density of 0.867-0.873 g/cc (E-112).
E is ethylene/vinyl acetate copolymer (more than 20 weight % comonomer).
F is vinylidene chloride/methyl acrylate copolymer.
G is amide wax with DSC melting point of 83.5 (+/− 2.5 degrees C.) (E-211).
H is ethylene/vinyl acetate copolymer (18.0 +/− 0.6 weight % vinyl acetate) with flow rate of 0.7 (+/− 0.10) g/10 minutes (Condition E, E-028) and density of 0.94 g/cc (E-112).
I is butyl acrylate/methyl methacrylate/butyl methacrylate terpolymer with bulk density of 0.25-0.50 g/mL, specific gravity of 1.13-1.15, and melting range of 150-160° C.
J is magnesium aluminum hydroxy carbonate hydrate with specific gravity of 2.1 g/cc and molar ratio $MgO/Al_2O_3$ of 4.0-5.0.
K is zeolite (sodium aluminosilicate).
L is styrenic block copolymer.
M is styrene/butadiene/styrene triblock copolymer.
N is ethylene/vinyl acetate copolymer (10-20 weight % comonomer).
O is ethylene/vinyl acetate copolymer (26.5-29.5 weight percent vinyl acetate) with melt index of 5.1-6.9 and density of 0.950 g/cc (E-112).
P is ethylene/vinyl acetate copolymer (more than 20 weight % comonomer).
Q is polystyrene copolymer.
R is hydrogenated styrene-butadiene copolymer with density of 1.0 g/cc, tensile strength of 26.0 MPa, and elongation of 640%.
S is hydrogenated styrene-butadiene copolymer with density of 1.02 g/cc, tensile strength of 23.0 MPa, and elongation of 600%.
T is ethylene multi-block copolymer with density of 0.866 g/cc.
U is linear low density ethylene/butene copolymer.
V is styrene/butadiene copolymer with specific gravity of 0.92-0.96 and melt index of 3.0-7.0 at 190° C.
W is ethylene/methyl acrylate copolymer with melt index of 0.4-0.6 (190° C.), density of 0.93-0.95 g/cc (23° C.), and melting point 74-76° C.
AA is low density polyethylene color concentrate.

TABLE 1-continued

Resin Identification

| Material Code | Trade Name or Designation | Source |
|---|---|---|

BB is antiblock.
CC is gray color concentrate in ethylene/vinyl acetate copolymer.
DD is ethylene/butyl acrylate copolymer with melt index of 0.35-0.65 g/10 minutes, density of 0.925-0.931 g/cc (at 23° C.), and DSC melting point of 87° C.
EE is beige color concentrate in ethylene/vinyl acetate copolymer.

TABLE 2

Film Identification

| Film ID | Layer | Formulation | Volume % | Mils |
|---|---|---|---|---|
| Film 1 Comparative | 1 | 70% A | 9.3 | 0.275 |
| | | 26% B | | |
| | | 0.32% C | | |
| | | 0.48% G | | |
| | | 3.2% H | | |
| | 2 | 50% A | 29.3 | 0.867 |
| | | 25% B | | |
| | | 25% D | | |
| | 3 | 100% E | 6.7 | 0.197 |
| | 4 | 95.92% F | 9.3 | 0.275 |
| | | 1.92% I | | |
| | | 0.96% J | | |
| | | 1.2% K | | |
| | 5 | 100% E | 6.7 | 0.197 |
| | 6 | 50% A | 29.3 | 0.867 |
| | | 25% B | | |
| | | 25% D | | |
| | 7 | 70% A | 9.3 | 0.275 |
| | | 26% B | | |
| | | 0.32% C | | |
| | | 0.48% G | | |
| | | 3.2% H | | |
| Film 2 | 1 | 70% A | 9.3 | 0.275 |
| | | 26% B | | |
| | | 0.32% C | | |
| | | 0.48% G | | |
| | | 3.2% H | | |
| | 2 Quiet Layer | 80% A | 29.3 | 0.867 |
| | | 10% L | | |
| | | 10% M | | |
| | 3 | 100% E | 6.7 | 0.197 |
| | 4 | 95.92% F | 9.3 | 0.275 |
| | | 1.92% I | | |
| | | 0.96% J | | |
| | | 1.2% K | | |
| | 5 | 100% E | 6.7 | 0.197 |
| | 6 Quiet Layer | 80% A | 29.3 | 0.867 |
| | | 10% L | | |
| | | 10% M | | |
| | 7 | 70% A | 9.3 | 0.275 |
| | | 26% B | | |
| | | 0.32% C | | |
| | | 0.48% G | | |
| | | 3.2% H | | |
| Film 3 | 1 | 70% A | 9.3 | 0.275 |
| | | 26% B | | |
| | | 0.32% C | | |
| | | 0.48% G | | |
| | | 3.2% H | | |
| | 2 Quiet Layer | 70% A | 29.3 | 0.867 |
| | | 10% L | | |
| | | 20% M | | |
| | 3 | 100% E | 6.7 | 0.197 |
| | 4 | 95.92% F | 9.3 | 0.275 |
| | | 1.92% I | | |
| | | 0.96% J | | |
| | | 1.2% K | | |
| | 5 | 100% E | 6.7 | 0.197 |
| | 6 Quiet Layer | 70% A | 29.3 | 0.867 |
| | | 10% L | | |
| | | 20% M | | |
| | 7 | 70% A | 9.3 | 0.275 |
| | | 26% B | | |
| | | 0.32% C | | |
| | | 0.48% G | | |
| | | 3.2% H | | |
| Film 4 | 1 | 70% A | 9.3 | 0.275 |
| | | 26% B | | |
| | | 0.32% C | | |
| | | 0.48% G | | |
| | | 3.2% H | | |
| | 2 Quiet Layer | 70% A | 29.3 | 0.867 |
| | | 20% L | | |
| | | 10% M | | |
| | 3 | 100% E | 6.7 | 0.197 |
| | 4 | 95.92% F | 9.3 | 0.275 |
| | | 1.92% I | | |
| | | 0.96% J | | |
| | | 1.2% K | | |
| | 5 | 100% E | 6.7 | 0.197 |
| | 6 Quiet Layer | 70% A | 29.3 | 0.867 |
| | | 20% L | | |
| | | 10% M | | |
| | 7 | 70% A | 9.3 | 0.275 |
| | | 26% B | | |
| | | 0.32% C | | |
| | | 0.48% G | | |
| | | 3.2% H | | |
| Film 5 | 1 | 70% A | 9.3 | 0.275 |
| | | 26% B | | |
| | | 0.32% C | | |
| | | 0.48% G | | |
| | | 3.2% H | | |
| | 2 Quiet Layer | 60% A | 29.3 | 0.867 |
| | | 20% L | | |
| | | 20% M | | |
| | 3 | 100% E | 6.7 | 0.197 |
| | 4 | 95.92% F | 9.3 | 0.275 |
| | | 1.92% I | | |
| | | 0.96% J | | |
| | | 1.2% K | | |
| | 5 | 100% E | 6.7 | 0.197 |
| | 6 Quiet Layer | 60% A | 29.3 | 0.867 |
| | | 20% L | | |
| | | 20% M | | |
| | 7 | 70% A | 9.3 | 0.275 |
| | | 26% B | | |
| | | 0.32% C | | |
| | | 0.48% G | | |
| | | 3.2% H | | |
| Film 6 | 1 | 70% N | 9.3 | 0.275 |
| | | 27% B | | |
| | | 0.24% C | | |
| | | 0.36% G | | |
| | | 2.4% H | | |
| | 2 Quiet Layer | 80% A | 29.3 | 0.867 |
| | | 10% L | | |
| | | 10% M | | |
| | 3 | 100% O | 6.7 | 0.197 |
| | 4 | 95.92% F | 9.3 | 0.275 |
| | | 1.92% I | | |
| | | 0.96% J | | |
| | | 1.2% K | | |
| | 5 | 100% O | 6.7 | 0.197 |
| | 6 Quiet Layer | 80% A | 29.3 | 0.867 |
| | | 10% L | | |
| | | 10% M | | |
| | 7 | 70% N | 9.3 | 0.275 |
| | | 27% B | | |
| | | 0.24% C | | |
| | | 0.36% G | | |
| | | 2.4% H | | |
| Film 7 | 1 | 70% N | 9.3 | 0.275 |
| | | 27% B | | |
| | | 0.24% C | | |
| | | 0.36% G | | |
| | | 2.4% H | | |
| | 2 | 70% A | 29.3 | 0.867 |

TABLE 2-continued

| Film ID | Layer | Formulation | Volume % | Mils |
|---|---|---|---|---|
|  | Quiet Layer | 20% L |  |  |
|  |  | 10% M |  |  |
|  | 3 | 100% O | 6.7 | 0.197 |
|  | 4 | 95.92% F | 9.3 | 0.275 |
|  |  | 1.92% I |  |  |
|  |  | 0.96% J |  |  |
|  |  | 1.2% K |  |  |
|  | 5 | 100% O | 6.7 | 0.197 |
|  | 6 | 70% A | 29.3 | 0.867 |
|  | Quiet Layer | 20% L |  |  |
|  |  | 10% M |  |  |
|  | 7 | 70% N | 9.3 | 0.275 |
|  |  | 27% B |  |  |
|  |  | 0.24% C |  |  |
|  |  | 0.36% G |  |  |
|  |  | 2.4% H |  |  |
| Film 8 | 1 | 70% N | 9.3 | 0.275 |
|  |  | 27% B |  |  |
|  |  | 0.24% C |  |  |
|  |  | 0.36% G |  |  |
|  |  | 2.4% H |  |  |
|  | 2 | 70% A | 29.3 | 0.867 |
|  | Quiet Layer | 15% L |  |  |
|  |  | 15% P |  |  |
|  | 3 | 100% O | 6.7 | 0.197 |
|  | 4 | 95.92% F | 9.3 | 0.275 |
|  |  | 1.92% I |  |  |
|  |  | 0.96% J |  |  |
|  |  | 1.2% K |  |  |
|  | 5 | 100% O | 6.7 | 0.197 |
|  | 6 | 70% A | 29.3 | 0.867 |
|  | Quiet Layer | 15% L |  |  |
|  |  | 15% P |  |  |
|  | 7 | 70% N | 9.3 | 0.275 |
|  |  | 27% B |  |  |
|  |  | 0.24% C |  |  |
|  |  | 0.36% G |  |  |
|  |  | 2.4% H |  |  |
| Film 9 | 1 | 70% N | 9.3 | 0.275 |
|  |  | 27% B |  |  |
|  |  | 0.24% C |  |  |
|  |  | 0.36% G |  |  |
|  |  | 2.4% H |  |  |
|  | 2 | 70% A | 29.3 | 0.867 |
|  | Quiet Layer | 15% L |  |  |
|  |  | 15% Q |  |  |
|  | 3 | 100% O | 6.7 | 0.197 |
|  | 4 | 95.92% F | 9.3 | 0.275 |
|  |  | 1.92% I |  |  |
|  |  | 0.96% J |  |  |
|  |  | 1.2% K |  |  |
|  | 5 | 100% O | 6.7 | 0.197 |
|  | 6 | 70% A | 29.3 | 0.867 |
|  | Quiet Layer | 15% L |  |  |
|  |  | 15% Q |  |  |
|  | 7 | 70% N | 9.3 | 0.275 |
|  |  | 27% B |  |  |
|  |  | 0.24% C |  |  |
|  |  | 0.36% G |  |  |
|  |  | 2.4% H |  |  |
| 10 | 1 | 70% N | 9.3 | 0.275 |
|  |  | 26% B |  |  |
|  |  | 3.2% H |  |  |
|  |  | 0.48% G |  |  |
|  |  | 0.32% C |  |  |
|  | 2 | 70% A | 29.3 | 0.867 |
|  | Quiet Layer | 15% S |  |  |
|  |  | 15% P |  |  |
|  | 3 | 100% E | 6.7 | 0.197 |
|  | 4 | 95.9% F | 9.3 | 0.275 |
|  |  | 1.9% I |  |  |
|  |  | 0.9% J |  |  |
|  |  | 1.2% K |  |  |
|  | 5 | 100% E | 6.7 | 0.197 |
|  | 6 | 70% A | 29.3 | 0.867 |
|  | Quiet Layer | 15% S |  |  |
|  |  | 15% P |  |  |
|  | 7 | 70% N | 9.3 | 0.275 |
|  |  | 26% B |  |  |
|  |  | 3.2% H |  |  |
|  |  | 0.48% G |  |  |
|  |  | 0.32% C |  |  |
| 11 | 1 | 70% N | 9.3 | 0.275 |
|  |  | 26% B |  |  |
|  |  | 3.2% H |  |  |
|  |  | 0.48% G |  |  |
|  |  | 0.32% C |  |  |
|  | 2 | 63.5% A | 29.3 | 0.867 |
|  | Quiet Layer | 15% L |  |  |
|  |  | 15% P |  |  |
|  |  | 6.5% CC |  |  |
|  | 3 | 100% E | 6.7 | 0.197 |
|  | 4 | 95.9% F | 9.3 | 0.275 |
|  |  | 1.9% I |  |  |
|  |  | 0.9% J |  |  |
|  |  | 1.2% K |  |  |
|  | 5 | 100% E | 6.7 | 0.197 |
|  | 6 | 63.5% A | 29.3 | 0.867 |
|  | Quiet Layer | 15% L |  |  |
|  |  | 15% P |  |  |
|  |  | 6.5% CC |  |  |
|  | 7 | 70% N | 9.3 | 0.275 |
|  |  | 26% B |  |  |
|  |  | 3.2% H |  |  |
|  |  | 0.48% G |  |  |
|  |  | 0.32% C |  |  |
| 12 | 1 | 70% N | 9.3 | 0.275 |
|  |  | 26% B |  |  |
|  |  | 3.2% H |  |  |
|  |  | 0.48% G |  |  |
|  |  | 0.32% C |  |  |
|  | 2 | 63.5% A | 29.3 | 0.867 |
|  | Quiet Layer | 15% L |  |  |
|  |  | 15% P |  |  |
|  |  | 6.5% CC |  |  |
|  | 3 | 100% E | 6.7 | 0.197 |
|  | 4 | 95.9% F | 9.3 | 0.275 |
|  |  | 1.9% I |  |  |
|  |  | 0.9% J |  |  |
|  |  | 1.2% K |  |  |
|  | 5 | 100% E | 6.7 | 0.197 |
|  | 6 | 63.5% A | 29.3 | 0.867 |
|  | Quiet Layer | 15% L |  |  |
|  |  | 15% P |  |  |
|  |  | 6.5% CC |  |  |
|  | 7 | 70% N | 9.3 | 0.275 |
|  |  | 26% B |  |  |
|  |  | 3.2% H |  |  |
|  |  | 0.48% G |  |  |
|  |  | 0.32% C |  |  |
| 13 | 1 | 70% A | 9.3 | 0.275 |
|  |  | 26% U |  |  |
|  |  | 3.2% H |  |  |
|  |  | 0.48% G |  |  |
|  |  | 0.32% C |  |  |
|  | 2 | 70% A | 29.3 | 0.867 |
|  | Quiet Layer | 15% V |  |  |
|  |  | 15% W |  |  |
|  | 3 | 100% O | 6.7 | 0.197 |
|  | 4 | 95.9% F | 9.3 | 0.275 |
|  |  | 1.9% I |  |  |
|  |  | 0.9% J |  |  |
|  |  | 1.2% K |  |  |
|  | 5 | 100% O | 6.7 | 0.197 |
|  | 6 | 70% A | 29.3 | 0.867 |
|  | Quiet Layer | 15% V |  |  |
|  |  | 15% W |  |  |
|  | 7 | 70% A | 9.3 | 0.275 |
|  |  | 26% U |  |  |
|  |  | 3.2% H |  |  |

TABLE 2-continued

| Film ID | Layer | Formulation | Volume % | Mils |
|---|---|---|---|---|
| | | 0.48% G | | |
| | | 0.32% C | | |
| 14 | 1 | 70% A | 9.3 | 0.275 |
| | | 26% U | | |
| | | 3.2% H | | |
| | | 0.48% G | | |
| | | 0.32% C | | |
| | 2 Quiet Layer | 62.7% A | 29.3 | 0.867 |
| | | 15% V | | |
| | | 15% W | | |
| | | 7.3% AA | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 62.7% A | 29.3 | 0.867 |
| | | 15% V | | |
| | | 15% W | | |
| | | 7.3% AA | | |
| | 7 | 70% A | 9.3 | 0.275 |
| | | 26% U | | |
| | | 3.2% H | | |
| | | 0.48% G | | |
| | | 0.32% C | | |
| 15 | 1 | 70% A | 9.3 | 0.275 |
| | | 26% U | | |
| | | 3.2% H | | |
| | | 0.48% G | | |
| | | 0.32% C | | |
| | 2 Quiet Layer | 85% A | 29.3 | 0.867 |
| | | 7% V | | |
| | | 8% W | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 85% A | 29.3 | 0.867 |
| | | 7% V | | |
| | | 8% W | | |
| | 7 | 70% A | 9.3 | 0.275 |
| | | 26% U | | |
| | | 3.2% H | | |
| | | 0.48% G | | |
| | | 0.32% C | | |
| 16 | 1 | 70% A | 9.3 | 0.275 |
| | | 26% U | | |
| | | 4% BB | | |
| | 2 Quiet Layer | 70% A | 29.3 | 0.867 |
| | | 15% V | | |
| | | 15% W | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 70% A | 29.3 | 0.867 |
| | | 15% V | | |
| | | 15% W | | |
| | 7 | 70% A | 9.3 | 0.275 |
| | | 26% U | | |
| | | 4% BB | | |
| 17 | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 15% L | | |
| | | 15% DD | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 70% A | 29.3 | 0.867 |
| | | 15% L | | |
| | | 15% DD | | |
| | 7 | 70% A | 9.3 | 0.275 |
| | | 26% B | | |
| | | 3.2% H | | |
| | | 0.48% G | | |
| | | 0.32% C | | |
| 18 | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 20% L | | |
| | | 10% DD | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 70% A | 29.3 | 0.867 |
| | | 20% L | | |
| | | 10% DD | | |
| | 7 | 70% A | 9.3 | 0.275 |
| | | 26% B | | |
| | | 3.2% H | | |
| | | 0.48% G | | |
| | | 0.32% C | | |
| 19 | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 20% L | | |
| | | 10% W | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 70% A | 29.3 | 0.867 |
| | | 20% L | | |
| | | 10% W | | |
| | 7 | 70% A | 9.3 | 0.275 |
| | | 26% B | | |
| | | 3.2% H | | |
| | | 0.48% G | | |
| | | 0.32% C | | |
| 20 | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 15% L | | |
| | | 15% W | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 Quiet Layer | 70% A | 29.3 | 0.867 |
| | | 15% L | | |
| | | 15% W | | |
| | 7 | 70% A | 9.3 | 0.275 |
| | | 26% B | | |
| | | 3.2% H | | |

TABLE 2-continued

Film Identification

| Film ID | Layer | Formulation | Volume % | Mils |
|---|---|---|---|---|
| | | 0.48% G | | |
| | | 0.32% C | | |
| 21 | 1 | 70% A | 9.3 | 0.275 |
| | | 26% B | | |
| | | 3.2% H | | |
| | | 0.48% G | | |
| | | 0.32% C | | |
| | 2 | 80% A | 29.3 | 0.867 |
| | Quiet Layer | 20% L | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 | 80% A | 29.3 | 0.867 |
| | Quiet Layer | 20% L | | |
| | 7 | 70% A | 9.3 | 0.275 |
| | | 26% B | | |
| | | 3.2% H | | |
| | | 0.48% G | | |
| | | 0.32% C | | |
| 22 | 1 | 70% A | 9.3 | 0.275 |
| | | 26% B | | |
| | | 3.2% H | | |
| | | 0.48% G | | |
| | | 0.32% C | | |
| | 2 | 60% A | 29.3 | 0.867 |
| | Quiet Layer | 20% L | | |
| | | 20% M | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 | 60% A | 29.3 | 0.867 |
| | Quiet Layer | 20% L | | |
| | | 20% M | | |
| | 7 | 70% A | 9.3 | 0.275 |
| | | 26% B | | |
| | | 3.2% H | | |
| | | 0.48% G | | |
| | | 0.32% C | | |
| 23 | 1 | 70% A | 9.3 | 0.275 |
| | | 26% B | | |
| | | 3.2% H | | |
| | | 0.48% G | | |
| | | 0.32% C | | |
| | 2 | 55.5% A | 29.3 | 0.867 |
| | Quiet Layer | 20% L | | |
| | | 20% M | | |
| | | 4.5% EE | | |
| | 3 | 100% O | 6.7 | 0.197 |
| | 4 | 95.9% F | 9.3 | 0.275 |
| | | 1.9% I | | |
| | | 0.9% J | | |
| | | 1.2% K | | |
| | 5 | 100% O | 6.7 | 0.197 |
| | 6 | 55.5% A | 29.3 | 0.867 |
| | Quiet Layer | 20% L | | |
| | | 20% M | | |
| | | 4.5% EE | | |
| | 7 | 70% A | 9.3 | 0.275 |
| | | 26% B | | |
| | | 3.2% H | | |
| | | 0.48% G | | |
| | | 0.32% C | | |
| Film 24 | 1 | 70% A | 9.3 | 0.275 |
| | | 26% B | | |
| | | 3.2% H | | |
| | | 0.48% G | | |
| | | 0.32% C | | |
| | 2 | 70% A | 29.3 | 0.867 |
| | Quiet Layer | 15% L | | |
| | | 15% P | | |
| | 3 | 100% E | 6.7 | 0.197 |
| | 4 | 95.9% F | 9.3 | 0.275 |
| | | 1.9% I | | |
| | | 0.9% J | | |
| | | 1.2% K | | |
| | 5 | 100% E | 6.7 | 0.197 |
| | 6 | 70% A | 29.3 | 0.867 |
| | Quiet Layer | 15% L | | |
| | | 15% P | | |
| | 7 | 70% A | 9.3 | 0.275 |
| | | 26% B | | |
| | | 3.2% H | | |
| | | 0.48% G | | |
| | | 0.32% C | | |
| Film 25 Prophetic | 1 | 70% A | 9.3 | 0.275 |
| | | 26% B | | |
| | | 3.2% H | | |
| | | 0.48% G | | |
| | | 0.32% C | | |
| | 2 | 80% A | 29.3 | 0.867 |
| | Quiet Layer | 20% R | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 | 80% A | 29.3 | 0.867 |
| | Quiet Layer | 20% R | | |
| | 7 | 70% A | 9.3 | 0.275 |
| | | 26% B | | |
| | | 3.2% H | | |
| | | 0.48% G | | |
| | | 0.32% C | | |
| Film 26 Prophetic | 1 | 70% A | 9.3 | 0.275 |
| | | 26% B | | |
| | | 3.2% H | | |
| | | 0.48% G | | |
| | | 0.32% C | | |
| | 2 | 70% A | 29.3 | 0.867 |
| | Quiet Layer | 30% R | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 | 70% A | 29.3 | 0.867 |
| | Quiet Layer | 30% R | | |
| | 7 | 70% A | 9.3 | 0.275 |
| | | 26% B | | |
| | | 3.2% H | | |
| | | 0.48% G | | |
| | | 0.32% C | | |
| Film 27 Prophetic | 1 | 70% A | 9.3 | 0.275 |
| | | 26% B | | |
| | | 3.2% H | | |
| | | 0.48% G | | |
| | | 0.32% C | | |
| | 2 | 60% A | 29.3 | 0.867 |
| | Quiet Layer | 40% R | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 | 60% A | 29.3 | 0.867 |
| | Quiet Layer | 40% R | | |
| | 7 | 70% A | 9.3 | 0.275 |
| | | 26% B | | |
| | | 3.2% H | | |
| | | 0.48% G | | |
| | | 0.32% C | | |

TABLE 2-continued

| Film ID | Layer | Formulation | Volume % | Mils |
|---|---|---|---|---|
| Film 28 Prophetic | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 15% R | | |
| | | 15% P | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 Quiet Layer | 70% A | 29.3 | 0.867 |
| | | 15% R | | |
| | | 15% P | | |
| | 7 | 70% A | 9.3 | 0.275 |
| | | 26% B | | |
| | | 3.2% H | | |
| | | 0.48% G | | |
| | | 0.32% C | | |
| Film 29 Prophetic | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 15% S | | |
| | | 15% P | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 Quiet Layer | 70% A | 29.3 | 0.867 |
| | | 15% S | | |
| | | 15% P | | |
| | 7 | 70% A | 9.3 | 0.275 |
| | | 26% B | | |
| | | 3.2% H | | |
| | | 0.48% G | | |
| | | 0.32% C | | |
| Film 30 Prophetic | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 15% T | | |
| | | 15% S | | |
| | 3 | 100% E | 6.7 | 0.197 |
| | 4 | 95.92% F | 9.3 | 0.275 |
| | | 1.92% I | | |
| | | 0.97% J | | |
| | | 12% K | | |
| | 5 | 100% E | 6.7 | 0.197 |
| | 6 Quiet Layer | 70% A | 29.3 | 0.867 |
| | | 15% T | | |
| | | 15% S | | |
| | 7 | 70% A | 9.3 | 0.275 |
| | | 26% B | | |
| | | 3.2% H | | |
| | | 0.48% G | | |
| | | 0.32% C | | |
| Film 31 Prophetic | 1 | 70% A | 9.3 | 0.275 |
| | | 26% B | | |
| | | 3.2% H | | |
| | | 0.48% G | | |
| | | 0.32% C | | |
| | 2 Quiet Layer | 70% A | 29.3 | 0.867 |
| | | 20% S | | |
| | | 10% T | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 | 70% A | 29.3 | 0.867 |
| | Quiet Layer | 20% S | | |
| | | 10% T | | |
| | 7 | 70% A | 9.3 | 0.275 |
| | | 26% B | | |
| | | 3.2% H | | |
| | | 0.48% G | | |
| | | 0.32% C | | |
| Film 32 Prophetic | 1 | 70% A | 9.3 | 0.275 |
| | | 26% B | | |
| | | 3.2% H | | |
| | | 0.48% G | | |
| | | 0.32% C | | |
| | 2 Quiet Layer | 90% A | 29.3 | 0.867 |
| | | 10% R | | |
| | 3 | 100% E | 6.7 | 0.197 |
| | 4 | 95.92% F | 9.3 | 0.275 |
| | | 1.92% I | | |
| | | 0.97% J | | |
| | | 1.2% K | | |
| | 5 | 100% E | 6.7 | 0.197 |
| | 6 Quiet Layer | 90% A | 29.3 | 0.867 |
| | | 10% R | | |
| | 7 | 70% A | 9.3 | 0.275 |
| | | 26% B | | |
| | | 3.2% H | | |
| | | 0.48% G | | |
| | | 0.32% C | | |

Example 1

Preparation of Films 1-24

Films 1-24 were produced on conventional hot blown film equipment using a multilayer annular die. This method is well known to those of ordinary skill in the art.

Example 2

Quietness Testing of Films 1-8, 10

The noise created by flexing each of films 1-8 and 10 was tested. Specifically, Film 1 was cut into 290 mm×35 mm strips and placed in a steady air flow (4.6 ms$^{-1}$, 20-21° C.) within an acoustic chamber with the acoustic doors closed to prevent contamination from external noise sources. The strips were taped evenly to a 1 mm steel band mounted across the chamber airflow opening. Air flow was generated outside of the test chamber and ducted through a long series of sound attenuators to remove outside noise. As a result, a quiet steady air flow was created where the noise measured was due solely to the flexing of the film samples.

A microphone (Microtech Gefell GmbH Microphone CE212, Ser. No. 91388) was placed about 350 mm from the end of the sample strips, perpendicular to the air flow. The A-weighted continuous equivalent sound pressure level in decibels ($L_{Aeq3min}$dB) was measured for 3 minutes using a Type 1 sound level meter (Blue Solo Type 1 Integrated Sound Level Meter, available from 01dB-Metravib, Serial No. 61199). The A-weighting was designed to adjust the frequency data to reflect the sensitivity of the human ear. The measurement was repeated in triplicate to test repeatability, using a fresh sample from a different film sheet.

The above experiment was repeated using Films 2-8 and 10. Film 10 is Dow 635, available from Dow Chemical Company (Midland, Mich., United States of America).

The results of the sound pressure level testing for Films 1-8 and 10 are given below in Table 3.

TABLE 3

Sound Pressure Level of Films 1-8, 10

| Film ID | Test ($L_{Aeq(3\ mins)}$) dB | | | | Range[1] (dB) | Difference from Film 1 (dB) |
|---|---|---|---|---|---|---|
| | 1 | 2 | 3 | Avg | | |
| 1 | 51.3 | 51.3 | 51.7 | 51.4 | −0.4 | 0 |
| 2 | 50 | 49.7 | 48.6 | 49.4 | −1.4 | −2.0 |
| 3 | 49.9 | 49.8 | 49.4 | 49.7 | −0.5 | −1.7 |
| 4 | 48.3 | 48.4 | 48.9 | 48.5 | −0.6 | −2.9 |

TABLE 3-continued

Sound Pressure Level of Films 1-8, 10

| Film ID | Test ($L_{Aeq(3\ mins)}$) dB | | | | Range[1] (dB) | Difference from Film 1 (dB) |
|---|---|---|---|---|---|---|
| | 1 | 2 | 3 | Avg | | |
| 5 | 47.2 | 47.4 | 47.8 | 47.5 | −0.6 | −3.9 |
| 6 | 50.0 | 50.1 | 49.8 | 50.0 | −0.3 | −1.4 |
| 7 | 48.2 | 48.3 | 48.5 | 48.2 | −0.1 | −3.2 |
| 8 | 48.8 | 48.7 | 48.8 | 48.8 | −0.1 | −2.6 |
| 10 | 49.3 | 49.5 | 49.6 | 49.5 | −0.3 | −1.9 |

[1]Range = maximum less minimum result from trials 1-3.

Example 3

Calculating Frequency Data for Films 1-8, 10

The sound pressure levels from Example 2 are presented below as an A-weighted third octave frequency spectrum. The data for films 1-5 is presented in Table 4 and the data from Films 6-8 and 10 are presented in Table 5.

TABLE 4

Tabulated Frequency Data for Films 1-5

| Frequency (Hz) | Film 1 $L_{A1/3\ octave}$ (dB) | Film 2 $L_{A1/3\ octave}$ (dB) | Film 3 $L_{A1/3\ octave}$ (dB) | Film 4 $L_{A1/3\ octave}$ (dB) | Film 5 $L_{A1/3\ octave}$ (dB) | Backgr. |
|---|---|---|---|---|---|---|
| 12.5 | −4.6 | −5.1 | −5.4 | −4.7 | −4.9 | −3.6 |
| 16 | −2.1 | −3.2 | −2.2 | −2.3 | −2.4 | −0.8 |
| 20 | −6.6 | −7.1 | −7.9 | −7.3 | −8.7 | −11.4 |
| 25 | −1.8 | −1.9 | −2.1 | −2.1 | −2.8 | −5.6 |
| 31.5 | 10.0 | 10.0 | 10.1 | 9.8 | 10.1 | 7.1 |
| 40 | 20.7 | 20.5 | 20.9 | 20.7 | 20.4 | 20.4 |
| 50 | 18.1 | 18.4 | 18.0 | 18.1 | 17.9 | 19.0 |
| 63 | 13.3 | 13.0 | 12.5 | 12.9 | 13.1 | 8.8 |
| 80 | 16.0 | 15.5 | 15.4 | 15.6 | 15.5 | 13.4 |
| 100 | 30.0 | 29.6 | 29.7 | 30.8 | 30.3 | 26.0 |
| 125 | 24.7 | 24.5 | 24.7 | 24.9 | 24.7 | 22.5 |
| 160 | 24.8 | 24.8 | 24.7 | 24.7 | 24.8 | 18.4 |
| 200 | 25.0 | 24.7 | 24.8 | 24.4 | 24.5 | 17.6 |
| 250 | 26.9 | 26.8 | 27.0 | 26.3 | 26.6 | 15.6 |
| 315 | 28.4 | 28.0 | 28.0 | 27.5 | 27.5 | 14.3 |
| 400 | 29.8 | 29.3 | 29.4 | 28.7 | 28.8 | 15.5 |
| 500 | 31.7 | 31.1 | 31.0 | 30.2 | 30.2 | 16.6 |
| 660 | 33.7 | 32.5 | 32.7 | 31.9 | 31.4 | 17.4 |
| 800 | 36.3 | 34.6 | 35.1 | 34.1 | 32.8 | 17.3 |
| 1,000 | 39.0 | 37.0 | 37.2 | 35.8 | 34.0 | 19.9 |
| 1,250 | 41.6 | 38.8 | 38.7 | 37.2 | 35.7 | 21.6 |
| 1,600 | 42.7 | 39.8 | 3934 | 38.5 | 38.1 | 19.5 |
| 2,000 | 43.3 | 39.7 | 39.9 | 38.7 | 38.7 | 15.8 |
| 2,500 | 44.8 | 40.6 | 41.0 | 39.7 | 38.1 | 13.5 |
| 3,150 | 46.6 | 41.6 | 41.9 | 39.8 | 37.7 | 12.5 |
| 4,000 | 45.9 | 40.6 | 40.3 | 38.5 | 37.5 | 8.9 |
| 5,000 | 44.8 | 39.5 | 39.3 | 38.8 | 36.6 | 7.4 |
| 6,300 | 42.2 | 36.8 | 36.2 | 34.9 | 34.2 | 6.6 |
| 8,000 | 38.3 | 33.6 | 32.6 | 31.9 | 30.7 | 5.6 |
| 10,000 | 33.8 | 29.3 | 28.8 | 28.3 | 28.0 | 4.3 |
| 12,500 | 28.4 | 25.4 | 25.0 | 24.2 | 24.6 | 2.2 |
| 16,000 | 23.0 | 20.9 | 21.3 | 20.3 | 20.6 | −0.4 |
| 20,000 | 16.1 | 14.7 | 15.4 | 14.2 | 15.9 | −3.1 |

TABLE 5

Tabulated Frequency Data for Films 6-8, 10

| Frequency (Hz) | Film 6 $L_{A1/3\ octave}$ (dB) | Film 7 $L_{A1/3\ octave}$ (dB) | Film 8 $L_{A1/3\ octave}$ (dB) | Film 10 $L_{A1/3\ octave}$ (dB) | Backgr. |
|---|---|---|---|---|---|
| 12.5 | −5.5 | −5.5 | −5.3 | −5.3 | −3.6 |
| 16 | −1.5 | −1.9 | −2.5 | −2.3 | −0.8 |
| 20 | −6.8 | −7.1 | −7.4 | −8.7 | −11.4 |
| 25 | −2.0 | −1.8 | −1.8 | −2.9 | −5.6 |
| 31.5 | 9.9 | 9.5 | 9.9 | 9.4 | 7.1 |
| 40 | 20.9 | 20.8 | 20.8 | 20.7 | 20.4 |
| 50 | 19.2 | 17.8 | 17.7 | 17.7 | 19.0 |
| 63 | 13.6 | 13.2 | 13.1 | 12.5 | 8.8 |
| 80 | 16.3 | 15.8 | 15.9 | 14.9 | 13.4 |
| 100 | 30 | 30.0 | 29.8 | 303 | 26.0 |
| 125 | 25.6 | 24.6 | 24.6 | 24.7 | 22.5 |
| 160 | 26.2 | 24.5 | 24.7 | 24.6 | 18.4 |
| 200 | 25.8 | 24.2 | 24.4 | 24.9 | 17.6 |
| 250 | 28 | 26.1 | 26.5 | 27.3 | 15.6 |
| 315 | 28.7 | 27.3 | 27.4 | 29.2 | 14.3 |
| 400 | 30.1 | 28.5 | 28.9 | 30.7 | 15.5 |
| 500 | 31.5 | 30.0 | 30.6 | 32.2 | 16.6 |
| 660 | 33.0 | 31.6 | 32.4 | 33.9 | 17.4 |
| 800 | 35.5 | 33.9 | 34.6 | 35.7 | 17.3 |
| 1,000 | 37.4 | 36.0 | 36.4 | 37.0 | 19.9 |
| 1,250 | 39.0 | 37.4 | 37.4 | 37.3 | 21.6 |
| 1,600 | 39.8 | 38.1 | 38.7 | 38.4 | 19.5 |
| 2,000 | 40.1 | 38.5 | 39.4 | 39.2 | 15.8 |
| 2,500 | 41.2 | 39.7 | 40.8 | 40.9 | 13.5 |
| 3,150 | 41.8 | 40.1 | 40.0 | 40.5 | 12.5 |
| 4,000 | 40.5 | 38.3 | 38.9 | 40.2 | 8.9 |
| 5,000 | 39.4 | 36.7 | 37.6 | 39.6 | 7.4 |
| 6,300 | 36.8 | 33.9 | 34.5 | 36.5 | 6.6 |
| 8,000 | 33.0 | 30.7 | 30.8 | 33.3 | 5.6 |
| 10,000 | 29.6 | 27.1 | 27.3 | 29.9 | 4.3 |
| 12,500 | 25.6 | 23.5 | 22.9 | 26.3 | 2.2 |
| 16,000 | 20.9 | 19.4 | 18.4 | 22.1 | −0.4 |
| 20,000 | 15.5 | 12.8 | 12.5 | 16.9 | −3.1 |

Example 4

Calculation of the Physical Properties of Films 1-10

The physical properties of Films 1-10 were tested and are summarized below in Table 6. Particularly, the average modulus, average tensile strength, and average elongation of the films were tested in accordance with ASTM D882-12.

The peak tan delta and temperature for Films 1-8, 10 was tested in accordance with ASTM E1640.

The tangent delta at 23° C. was tested in accordance with ASTM D-4065.

The continuous equivalent sound pressure level values were taken from Table 3, above.

TABLE 6

Physical Properties of Films 1-10

| Film ID | Avg. Modulus (kg/cm$^2$) | Avg. Tensile Strength (kg/cm$^2$) | Average Elongation (%) | Peak Tan Delta and Temp. | Tan Delta (23° C.) | $L_{Aeq}$ Quietness (dB) |
|---|---|---|---|---|---|---|
| 1 | 524.0 | 211.0 | 632.0 | 0.236, 19.4 | 0.0564 | 51.4 |
| 2 | 406.0 | 262.0 | 632.0 | 0.209, 14.1 | 0.161 | 49.4 |
| 3 | 388.0 | 274.0 | 662.0 | 0.241, 14.1 | 0.196 | 49.7 |
| 4 | 372.0 | 284.0 | 668.0 | 0.320, 17.1 | 0.286 | 48.5 |
| 5 | 362.0 | 305.5 | 731.0 | 0.315, 15.7 | 0.368 | 47.5 |
| 6 | 448.0 | 252.0 | 680.0 | 0.209, 14.1 | 0.161 | 50.0 |
| 7 | 449.0 | 253.0 | 639.0 | 0.320, 17.1 | 0.286 | 48.2 |
| 8 | 397.0 | 220.0 | 600.0 | 0.121, 21.1 | 0.225 | 48.8 |
| 9 | 418.0 | 196.0 | 602.0 | n/a | n/a | n/a |
| 10 | 625.0 | 136.0 | 625.0 | n/a | n/a | 49.5 |

Example 5

Comparison of the Quietness of Films 1, 2, 3, 4, 5, and 10

Ten people were asked to compare Films 1, 2, 3, 4, 5, and 10 by selecting the quieter of two films by handling each film sample combination and recording which was the quieter film. The frequency matrix for quietness is given below in Table 7 and the proportion matrix for quietness is given in Table 8. From the table, the quietest films were Films 4 and 5, followed by Film 3, then Film 2. The least quiet films tested were Comparative Films 1 and 10.

TABLE 7

Frequency Matrix for Quietness - Films 1, 2, 3, 4, 5, 10

| Film ID | 1 | 2 | 3 | 4 | 5 | 10 |
|---|---|---|---|---|---|---|
| 1 | X | 15 | 17 | 13 | 15 | 14 |
| 2 | 5 | X | 14 | 16 | 16 | 5 |
| 3 | 3 | 6 | X | 13 | 17 | 1 |
| 4 | 7 | 4 | 7 | X | 6 | 1 |
| 5 | 5 | 4 | 3 | 14 | X | 2 |
| 10 | 6 | 15 | 19 | 19 | 18 | X |

TABLE 8

Proportion Matrix for Quietness - Films 1, 2, 3, 4, 5, 10

| Film ID | 1 | 2 | 3 | 4 | 5 | 10 |
|---|---|---|---|---|---|---|
| 1 | 0.50 | 0.75 | 0.85 | 0.65 | 0.75 | 0.70 |
| 2 | 0.25 | 0.50 | 0.70 | 0.80 | 0.80 | 0.25 |
| 3 | 0.15 | 0.30 | 0.50 | 0.65 | 0.85 | 0.05 |
| 4 | 0.35 | 0.20 | 0.35 | 0.50 | 0.30 | 0.05 |
| 5 | 0.25 | 0.20 | 0.15 | 0.70 | 0.50 | 0.10 |
| 10 | 0.30 | 0.75 | 0.95 | 0.95 | 0.90 | 0.50 |
| Sum of P | 1.80 | 2.70 | 3.5 | 4.25 | 4.10 | 1.65 |
| Mean of P | 0.30 | 0.45 | 0.5833 | 0.7083 | 0.6833 | 0.275 |
| Z score | −0.503 | −0.103 | 0.201 | 0.505 | 0.408 | −0.600 |
| Normalized Z score | 0.097 | 0.703 | 0.801 | 1.105 | 1.008 | 0.0 |

Example 6

Comparison of the Softness of Films 1, 2, 3, 4, 5, and 10

Ten people were asked to compare Films 1, 2, 3, 4, 5, and 10 by selecting the softer of two films by handling each film sample combination and recording which was the softer film. The frequency matrix for softness is given below in Table 9 and the proportion matrix for softness is given in Table 10. From the table, the softest film was Film 4, followed by Film 3, then Films 5 and 2, and Comparative Film 10. The least soft film tested was Comparative Film 1.

TABLE 9

Frequency Matrix for Softness - Films 1, 2, 3, 4, 5, 10

| Film ID | 1 | 2 | 3 | 4 | 5 | 10 |
|---|---|---|---|---|---|---|
| 1 | X | 16 | 16 | 17 | 16 | 11 |
| 2 | 4 | X | 11 | 15 | 10 | 6 |
| 3 | 4 | 9 | X | 13 | 10 | 7 |
| 4 | 3 | 5 | 7 | X | 11 | 6 |
| 5 | 4 | 10 | 10 | 9 | X | 3 |
| 10 | 9 | 14 | 13 | 14 | 17 | X |

TABLE 10

Proportion Matrix for Softness - Films 1, 2, 3, 4, 5, 10

| Film ID | 1 | 2 | 3 | 4 | 5 | 10 |
|---|---|---|---|---|---|---|
| 1 | 0.50 | 0.80 | 0.80 | 0.85 | 0.80 | 0.55 |
| 2 | 0.20 | 0.50 | 0.55 | 0.75 | 0.50 | 0.30 |
| 3 | 0.20 | 0.45 | 0.50 | 0.65 | 0.50 | 0.35 |
| 4 | 0.15 | 0.25 | 0.35 | 0.50 | 0.55 | 0.30 |
| 5 | 0.20 | 0.50 | 0.50 | 0.45 | 0.50 | 0.15 |
| 10 | 0.45 | 0.70 | 0.65 | 0.70 | 0.85 | 0.50 |
| Sum of P | 1.70 | 3.20 | 3.35 | 3.90 | 3.20 | 2.15 |
| Mean of P | 0.2833 | 0.533 | 0.5583 | 0.65 | 0.533 | 0.3583 |
| Z score | −0.507 | 0.009 | 0.105 | 0.300 | 0.009 | −0.307 |
| Normalized Z score | 0.0 | 0.516 | 0.612 | 0.807 | 0.516 | 0.200 |

Example 7

Dynamic Mechanical Analysis Data for the Quiet Layer of Films 11-18

Dynamic mechanical analysis (DMA) data for the quiet layer of Films 11-18 was tested using ASTM D-7028. The results are given below in Table 11.

TABLE 11

DMA Data for the Quiet Layer of Films 11-18

| Film ID | Peak Tan Delta, Temp. (° C.) | Peak Tan Delta at 23° C. |
|---|---|---|
| 11 | 0.191, 14.2 | 0.142 |
| 12 | 0.292, 14.3 | 0.219 |
| 13 | 0.358, 17.2 | 0.305 |
| 14 | 0.430, 17.3 | 0.389 |
| 15 | 0.264, 12.8 | 0.184 |
| 16 | 0.240, −4.0 | 0.100 |
| 17 | 0.211, 2.4 | 0.100 |
| 18 | 0.230, 5.5 | 0.125 |

Example 8

Comparison of the Quietness of Films 17, 18, 19, 20, 21, and 24

Ten people were asked to compare Films 17, 18, 19, 20, 21, and 24 by selecting the quieter of two films by handling each film sample combination and recording which was the quieter film. The frequency matrix for quietness is given below in Table 12 and the proportion matrix for quietness is given in Table 13. From the table, the quietest films were Films 18, 20, and 21, followed by Film 19. The least quiet films tested were films 17 and 24.

TABLE 12

Frequency Matrix for Quietness - Films 17, 18, 19, 20, 21, and 24

| Film ID | 24 | 17 | 18 | 19 | 20 | 21 |
|---|---|---|---|---|---|---|
| 24 | X | 3 | 8 | 6 | 10 | 10 |
| 17 | 7 | X | 7 | 6 | 6 | 6 |
| 18 | 2 | 3 | X | 5 | 4 | 5 |
| 19 | 4 | 4 | 5 | X | 7 | 3 |
| 20 | 0 | 4 | 6 | 3 | X | 7 |
| 21 | 0 | 4 | 5 | 7 | 3 | X |

TABLE 13

Proportion Matrix for Quietness - Films 17, 18, 19, 20, 21, and 24

| Film ID | 24 | 17 | 18 | 19 | 20 | 21 |
|---|---|---|---|---|---|---|
| 24 | 0.5 | 0.3 | 0.8 | 0.6 | 1.0 | 1.0 |
| 17 | 0.7 | 0.5 | 0.7 | 0.6 | 0.6 | 0.6 |
| 18 | 0.2 | 0.3 | 0.5 | 0.5 | 0.4 | 0.5 |
| 19 | 0.4 | 0.4 | 0.5 | 0.5 | 0.7 | 0.3 |
| 20 | 0.0 | 0.4 | 0.6 | 0.3 | 0.5 | 0.7 |
| 21 | 0.8 | 0.4 | 0.5 | 0.7 | 0.3 | 0.5 |
| Sum of P | 1.8 | 2.3 | 3.6 | 3.2 | 3.5 | 3.6 |
| Mean of P | 0.3 | 0.3833 | 0.6 | 0.5333 | 0.5833 | 0.60 |
| Z score | −0.503 | −0.2091 | 0.255 | 0.0901 | 0.201 | 0.2055 |
| Normalized Z score | 0.0 | 0.2939 | 0.7085 | 0.5931 | 0.7040 | 0.7085 |

Example 9

Dynamic Mechanical Analysis Data and Tensile Strength for the Quiet Layer of Films 8, 24, 17, 18, 19, 20, and 21

Dynamic mechanical analysis (DMA) and tensile strength data for the quiet layer of Films 8, 24, 17, 18, 19, 20, and 21 was tested using ASTM D-7028 and ASTM 882-12. The results are given below in Table 14.

TABLE 14

DMA Tensile Strength Data for the Quiet Layer of Films 8, 24, 17-21

| Film ID | Peak Tan Delta, Temperature (° C.) | Peak Tan Delta at 23° C. | Longitudinal, Transverse Tensile Strength (kg/cm$^2$) |
|---|---|---|---|
| 8 | 0.317, 17 | 0.260 | 279, 209 |
| 24 | 0.285, 17.09 | 0.204 | 272, 244 |
| 17 | 0.236, 16.94 | 0.176 | 267, 218 |
| 18 | 0.405, 16.97 | 0.347 | 272, 208 |
| 19 | 0.324, 17.27 | 0.272 | 265, 227 |
| 20 | 0.335, 17.09 | 0.269 | 254, 233 |
| 21 | 0.352, 17.09 | 0.276 | 286, 252 |

What is claimed is:
1. A multilayer film comprising:
 a. a barrier layer; and
 b. at least one quiet layer positioned adjacent to the barrier layer, said quiet layer comprising:

i. a polymer blend having 10 to 20 weight percent of an unhydrogenated styrene-isoprene-styrene block copolymer and 10 to 20 weight percent of a hydrogenated styrene-ethylene-propylene-styrene block copolymer, and ii. 60 to 80 weight percent ethylene ester vinyl acetate copolymer, based on the total weight of the layer; wherein said quiet layer has a tangent delta value of at least 0.10 at a temperature range of about 25° C. to 40° C., in accordance with ASTM D-4065 and said film exhibits a tensile strength of about 150 to 400 kg/m², measured in accordance with ASTM 882-12.

2. The film of claim 1, wherein said at least one quiet layer is positioned directly adjacent to said barrier layer.

3. The film of claim 1, wherein said film has an oxygen transmission rate of less than about 400 cc/m²/day-atm, measured in accordance with ASTM D-3925.

4. The film of claim 1, wherein said quiet layer has a tangent delta value of about 0.1 to 0.4 at a temperature range of about −25° C. to 40° C., in accordance with ASTM D-4065.

5. The film of claim 1, wherein the barrier layer comprises about 100 weight percent PVDC, based on the total weight of the layer.

6. The film of claim 5, wherein the PVDC comprises about 51-99 weight percent vinylidene chloride and about 1-49 weight percent unsaturated monomer or comonomer.

7. The film of claim 1, further comprising first and second exterior layers comprising about 60-80 weight percent ethylene ester copolymer and about 20-40 weight percent ethylene/alpha-olefin, based on the total weight of the layer.

8. The film of claim 1, wherein the quiet layer contains no ethylene/alpha-olefin.

9. A method of constructing a pouch, said method comprising:

a. providing a multilayer film comprising
  a barrier layer; and
  at least one quiet layer positioned adjacent to the barrier layer, said quiet layer comprising:
    i. a polymer blend having 10 to 20 weight percent of an unhydrogenated styrene-isoprene-styrene block copolymer and 10 to 20 weight percent of a hydrogenated styrene-ethylene-propylene-styrene block copolymer, and
    ii. 60 to 80 weight percent ethylene vinyl acetate copolymer, based on the total weight of the layer; wherein said quiet layer has a tangent delta value of at least 0.10 at a temperature range of about −25° C. to 40° C., in accordance with ASTM D-4065; and
  wherein said film exhibits a tensile strength of about 150 to 400 kg/m², measured in accordance with ASTM 882-12; and b. using said film to form a pouch comprising a first wall and a second wall joined together to define a closed compartment having an interior.

10. The method of claim 9, wherein the at least one quiet layer of the film is positioned directly adjacent to the barrier layer.

11. The method of claim 9, wherein said film has an oxygen transmission rate of less than about 400 cc/m²-day-atm, measured in accordance with ASTM D-3925.

12. The method of claim 9, wherein said quiet layer has a tangent delta value of about 0.1 to 0.4 at a temperature range of about −25° C. to 40° C., in accordance with ASTM D-4065.

13. The method of claim 9, wherein the barrier layer of said film comprises about 100 weight percent PVDC.

14. A pouch constructed from the film of claim 1, the pouch being selected from one of the following: colostomy bag, ileostomy bag, incontinence bag, medical collection bag, parenteral solution bag, or food packaging bag.

15. The pouch of claim 14, wherein the at least one quiet layer of the film is positioned directly adjacent to the barrier layer.

16. The pouch of claim 14, wherein said film has an oxygen transmission rate of less than about 400 cc/m2-day-atm, measured in accordance with ASTM D-3925.

17. The pouch of claim 14, wherein said quiet layer has a tangent delta value of about 0.1 to 0.4 at a temperature range of about −25° C. to 40° C., in accordance with ASTM D-4065.

18. The pouch of claim 14, wherein the barrier layer of said film comprises about 100 weight percent PVDC.

\* \* \* \* \*